United States Patent
Nishio

[11] Patent Number: 6,096,392
[45] Date of Patent: Aug. 1, 2000

[54] CHOLESTERIC LIQUID CRYSTAL DISPLAY ELEMENT

[75] Inventor: Yoshiyuki Nishio, Hachioji, Japan

[73] Assignee: Daicel Chemical Industries, Ltd., Tokyo, Japan

[21] Appl. No.: 09/111,862

[22] Filed: Jul. 8, 1998

[30] Foreign Application Priority Data

Jul. 9, 1997 [JP] Japan ................................. 9-183541

[51] Int. Cl.[7] .................................................. C09K 19/00
[52] U.S. Cl. ................. 428/1.1; 252/299.01; 252/299.5; 252/299.7; 349/183
[58] Field of Search ........................... 252/299.01, 299.5, 252/299.7; 349/182, 183; 345/88; 428/1.1

[56] References Cited

U.S. PATENT DOCUMENTS 5,615,040  3/1997  Watanabe et al. ...................... 359/288

FOREIGN PATENT DOCUMENTS

0323008A2  7/1989  European Pat. Off. .
6-220453A  8/1994  Japan .
7-23471B2  3/1995  Japan .

OTHER PUBLICATIONS

Yoshiyuki, *Cellulose Commun.*, vol. 4, No. 2, pp. 65–68 (1997) (w/Abstract).
Chemical Abstracts, vol. 127, No. 14 (Oct. 1997).
Nishio et al., *Macromolecules*, vol. 31, pp. 2384–2386 (1998).
Okubo, *J. Chem. Soc. Faraday Trans.*, vol. 87, No. 4, pp. 607–609 (1991).
Database WPI, Section Ch., Week 9436, 1994.
Database WPI, Section Ch., Week 9434, 1994.

*Primary Examiner*—Shean C. Wu
*Attorney, Agent, or Firm*—Birch, Stewart, Kolasch & Birch, LLP

[57] ABSTRACT

A liquid crystal composition comprising a cholesteric liquid-crystal polymer, an electrolyte, and an aqueous medium is hermetically interposed between a pair of electrodes and an electric field is applied to the assemblage to control the display color. The liquid crystal composition can be provided in the form of a transparent solution of a cholesteric liquid-crystal polymer (e.g. a cellulose derivative such as a hydroxyalkylcellulose), an electrolyte (e.g. a water-soluble inorganic salt), and an aqueous medium (e.g. an aqueous solvent with a water content of 80 to 100 weight %). Using a cholesteric liquid-crystal polymer, a display device whose display color can be controlled with an electric field is provided.

11 Claims, 1 Drawing Sheet

CHOLESTERIC LIQUID CRYSTAL DISPLAY ELEMENT

FIELD OF THE INVENTION

The present invention relates to an electric field-controllable color liquid crystal display element or device comprising a cholesteric liquid-crystal polymer.

BACKGROUND OF THE INVENTION

The twisted nematic (TN) liquid crystal element or device using a low-molecular-weight nematic liquid crystal in combination with polarizer film has been used in a diversity of fields. In parallel with the recent popularity of TN liquid crystal display elements or devices, there is a mounting interest in the possible exploitation of other kinds of liquid crystals such as high-molecular-weight liquid crystals in display elements or devices. However, high-molecular-weight liquid crystals, which are comparatively large in molecular size, are not so mobile that when the electric field is turned on or off for display control, it takes a long time for the orientation or disorientation of the polymer backbone chain to be consummated. Therefore, it has been considered impossible to implement an electric field-controllable display device using a high-molecular-weight liquid crystal.

Meanwhile, as liquid crystals other than nematics, smectic and cholesteric liquid crystals are known. The cholesteric liquid crystal, which has a periodic structure (helicoidal molecular orientation), selectively reflects a given wavelength component of light so that unlike the TN liquid crystal display, the cholesteric LC display element or device does not require a color filter or a polarizer. Therefore, display devices employing cholesteric liquid crystals feature sharp and bright display colors and can find application as a variety of optical media. However, because of their principle of display, the display colors of cholesteric liquid crystals can hardly be controlled by an electric or magnetic field, with the result that it has been generally believed that those liquid crystals cannot be effectively implemented as color display elements or devices.

Referring to such cholesteric liquid crystals, Japanese Patent Publication No. 23471/1995 (JP-B-7-23471) discloses a lyotropic liquid crystal composition forming a liquid crystal phase upon mixing with a solvent, which comprises a solution of a hydroxyethylcellulose in water, an organic solvent, or a mixture of such solvents.

Japanese Patent Application Laid-open No. 220453/1994 (JP-A-6-220453) discloses a liquid crystal composition comprising a lyotropic cholesteric liquid crystal composed of a linear homopolysaccharide derivative, typically hydroxypropylcellulose, and water supplemented with 0.05 to 5 weight % of a water-soluble electrolyte and a laminate structure fabricated by layering the composition on a substrate which is at least partially transparent. This literature states that the above liquid crystal composition undergoes a transition from a liquid crystal phase to a random cohesive or aggregate phase to develop opacity by scattering visible light, that addition of a water-soluble electrolyte to the composition depresses the opacification temperature of the liquid crystal composition to room temperature or a temperature close to room temperature, and that an automatic switching from the transparent liquid crystal phase to the opaque scattered phase or vice versa can be achieved with direct solar radiation energy. However, none of the literature suggest the feasibility of color display by means of an electric field.

SUMMARY OF THE INVENTION

It is, therefore, an object of the invention to provide a liquid crystal display element or device comprising a polymer liquid crystal and having controllable display color by application of an electric field.

It is another object of the invention to provide a liquid crystal display element or device comprising a lyotropic cholesteric liquid crystal and providing for the ease of electric field-control of display color.

The inventor of this invention found that despite the very simple constitution using a polymer showing a cholesteric liquid crystal phase in a binary system or coexisting system comprising the cholesteric liquid crystal polymer and a low-molecular-weight electrolyte, the display color of the cholesteric liquid crystal can be effectively and efficiently controlled by application of an electric field in an aqueous medium through modification of the ionic environment, and accordingly have completed the present invention.

The liquid crystal display element or device of the invention comprises a pair of electrodes and, as hermetically interposed or sandwiched therebetween, a liquid crystal composition composed of a cholesteric liquid-crystal polymer, an electrolyte, and an aqueous medium where its display color can be controlled by an electric field. Therefore, the display element or device of the invention is useful as a color liquid crystal element or device. In this display elemental device, the liquid crystal composition may be a transparent solution of a cholesteric liquid-crystal high polymer, an electrolyte, and an aqueous solvent. The liquid-crystal polymer mentioned above includes but is not limited to cellulose derivatives such as hydroxyalkylcelluloses, and the aqueous solvent mentioned above may for example be an aqueous solvent with a water content of 80 to 100 weight %.

The cholesteric liquid crystal has a helicoidal periodic structure and the following relation (1) holds between the length of its repeating unit (cholesteric pitch P) and the maximum selectable reflection wavelength $\lambda_M$.

$$\lambda_M = n \cdot P \tag{1}$$

where $\lambda_M$ represents the maximum selectable reflection wavelength, n represents the mean refractive index of the liquid crystal, and P represents cholesteric pitch.

Therefore, the maximum selectable reflection wavelength $\lambda_M$ is dependent on cholesteric pitch P and the display color can be controlled by adjusting the cholesteric pitch P. Moreover, in the cholesteric liquid crystal, a circularly polarized component of light corresponding to the helicoidal twist (cholesteric sense) is selectively reflected.

When an electrolyte (e.g. an inorganic salt) is added to an aqueous solution of a polymer substance showing a cholesteric liquid crystal phase and the behavior of the resulting cholesteric liquid crystal is investigated, it is found that the cholesteric pitch P is increased or decreased according to the type and concentration of the ionic environment so that the maximum selectable reflection wavelength $\lambda_M$, i.e. display color, is remarkably altered.

The display mechanism of this liquid crystal display element or device is now described with reference to the accompanying drawings, taking the combined use of a cholesteric polymer having a cholesteric pitch P with a positive slope with respect to the anion concentration, with a low-molecular-weight electrolyte as an example.

As shown in FIG. 1, when an electric field is applied to a liquid crystal composition 3 (i.e. a binary system such that the liquid-crystal polymer and the low-molecular-weight electrolyte coexist in an aqueous medium), the anion and the cation are localized at positive electrode 1 and negative electrode 2, respectively, to form an ion gradient. With the formation of this ion ingredient is formed, the cholesteric pitch P of the liquid-crystal polymer is increased at the positive electrode side compared with the case in which no ion ingredient exists (i.e. no electric field is applied) as illustrated in FIG. 1, with the cholesteric pitch P at the negative electrode side being conversely decreased. Therefore, compared with the case in which no electric field is applied, a display color of a longer wavelength is available at the positive electrode side and conversely a display color of a shorter wavelength is available at the negative electrode side as can be inferred from the above equation (1).

The liquid crystal display element or device of the invention has the following characteristics.

(A) The display color is not controlled by the mobility of a high polymer liquid crystal but controlled by the migration of the electrolyte ions with a greater mobility responding readily to an electric field, with the result that despite its being a display element or device utilizing a polymer liquid crystal, the display can be controlled with an electric field.

(B) The display color of a cholesteric liquid crystal is controlled by ion-driving with an electric field so as to adjust the ionic environment, so that it is easy to effect an electric-field control of the display color of a cholesteric liquid crystal which has heretofore been considered difficult.

The present invention further discloses a use of the liquid crystal composition for a color liquid crystal display element or device.

DETAILED DESCRIPTION OF THE INVENTION

Figure 1:
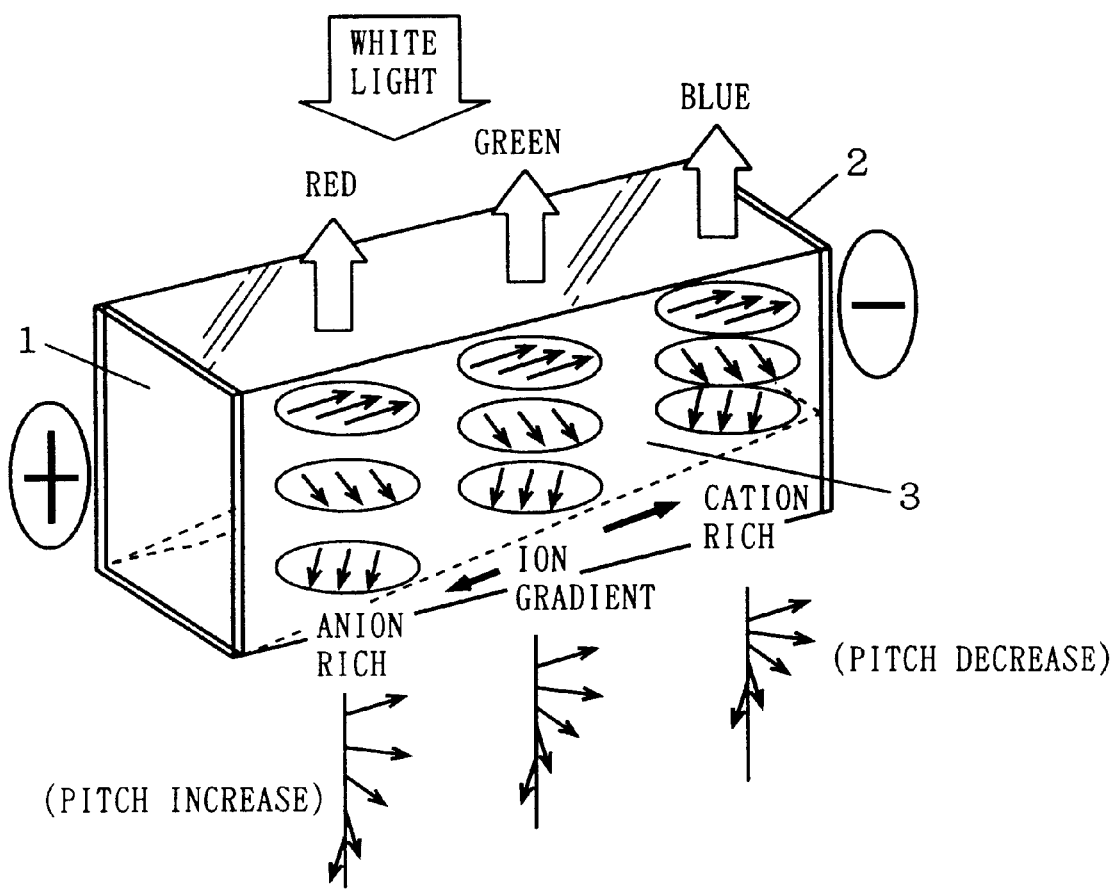
FIG. 1 is a schematic drawing illustrating the display mechanism of a liquid crystal display element of the invention.

The liquid-crystal high polymer for the liquid crystal display element or device of the invention includes any and all high-molecular-weight polymers that are soluble in aqueous media and behave as cholesteric liquid crystals in solution. The polymer may be a water-soluble polymer and may have a weight-average molecular weight of 1,000 to $25 \times 10^4$ and preferably 2,000 to $10 \times 10^4$. Among such high polymers are cellulose derivatives (e.g. cellulose ethers). Cellulose derivatives are characterized by the semi-rigidity and chiralty of the molecular chain by which a cholesteric liquid crystal is easily formed.

Cellulose derivatives include, for example, cellulose ethers, such as hydroxyalkyl-celluloses (e.g. hydroxy-$C_{1-4}$ alkyl-celluloses such as hydroxyethylcellulose, hydroxypropylcellulose, etc.), alkyl-celluloses (e.g. $C_{1-4}$ alkylcelluloses such as methylcellulose, ethylcellulose, etc.), aralkyl-celluloses (e.g. benzylcellulose, tritylcellulose, etc.), hydroxyalkyl-alkyl-celluloses (e.g. hydroxy-$C_{1-4}$ alkyl-$C_{1-4}$ alkylcelluloses such as hydroxyethylmethylcelluloses, hydroxyethylethylcellulose, hydroxypropylmethylcellulose, hydroxypropylethylcellulose, etc.), and cyanoalkylcelluloses (e.g. cyanoethylcellulose etc.). Those liquid-crystal polymers can be used each alone or in a combination of 2 or more species.

The preferred liquid-crystal polymer includes hydroxyalkylcelluloses (e.g. hydroxypropylcellulose).

In the cholesteric liquid crystal, the direction of the twist (cholesteric sense) may be either of the clockwise and counterclockwise directions.

Referring, further, to the cellulose derivative, the average degree of polymerization and the average degree of substitution are not particularly restricted unless its solution will be too viscous and the liquid crystallinity and the responsiveness of the system to an electric field be adversely affected. The average degree of polymerization may, for example be selected from the range of about 20 to 600, preferably about 30 to 400, and more preferably about 50 to 400. The average degree of substitution may for example be selected from the range of about 1 to 3, usually about 1.5 to 3.0, preferably about 1.5 to 2.9, and more preferably about 1.6 to 2.8.

The concentration of the liquid-crystal polymer can be freely selected from the range in which the polymer exhibits stable liquid crystallinity in solution, for example about 15 to 75 weight %, preferably about 30 to 70 weight %, and more preferably about 40 to 70 weight %. The liquid-crystal polymer can be used in the form of a solution of high concentration (e.g. about 45 to 70 weight %, preferably about 50 to 65 weight %).

The electrolyte may be dissociable into a cation and an anion in an aqueous medium or may be a compound which is dissociated into a cation and an anion upon application of an electric field.

As the electrolyte, a polymeric electrolyte may also be used. Usually, however, a low-molecular-weight electrolyte with a high field-effect mobility, particularly a water-soluble electrolyte (e.g. an inorganic salt or an inorganic electrolyte) is used. The mass (or molecular weight) of the low-molecular-weight electrolyte may for example be not greater than 500 (about 20 to 500, preferably about 30 to 400, more preferably about 40 to 300, and particularly about 40 to 250).

The cation species of the electrolyte may be an inorganic cation or an organic cation. The inorganic cation includes, for example, ammonium ion, alkali metal ions (Li, Na, K, Cs, etc.), alkaline earth metal ions (e.g. Mg, Ca, Sr, etc.), transition metal ions (e.g. Ti, Zr, Cr, Fe, Co, Ni, Cu, Ag, Au, Cd, etc.), aluminum ion, lanthanoid metal ions, and actinoid metal ions. The organic cation includes, for example, quaternary ammonium ions, guanidinium ions, etc. The valence number of the cation species is not particularly restricted but may range from 1 to about 4. Among such cation species, inorganic cations, particularly alkali metal ions and alkaline earth metal ions, are preferred. The cation species is not limited to a single species but may comprise a plurality of different ion species.

The anion species of the electrolyte may be an inorganic anion or an organic anion. As the inorganic anion, there may be mentioned, for example, $SCN^-$(thiocyanate ion), halide (or halogen) ions ($I^-$, $Br^-$, $Cl^-$, $F^-$) and inorganic acid anions [$NO_3^-$(nitrate ion), $SO_4^{2-}$(sulfate ion), $ClO_4^-$(perchlorate ion), etc.]. The organic anion includes, for example, organic acid anions [e.g. a carboxylic acid anion such as $CH_3COO^-$ (acetate ion), $C_2H_5COO^-$(propionate ion), $CCl_3COO^-$ (trichloroacetate ion) and $CF_3COO^-$(trifluoroacetate ion), a sulfonic acid anion such as methanesulfonate ion, ethanesulfonate ion, benzenesulfonate ion, p-toluenesulfonate ion, etc.].

Among those anion species, inorganic anions, particularly thiocyanate anions, halide anions, and inorganic acid anions, are preferred. The anion species is not limited to a single species but may comprise two or more different ion species.

The representative electrolyte includes, for example, lithium salts such as lithium thiocyanate, lithium halides (e.g. lithium iodide, lithium bromide, lithium chloride, lithium fluoride), lithium nitrate, etc. and the corresponding metal salts (sodium salts, potassium salts, cesium salts, calcium salts, etc.).

In the cholesteric liquid crystal, the series of change in cholesteric pitch P appears to correspond to the degree of breakdown of the cage structure of water by the concomitant ion (e.g. the series of chaotropic effect). Taking anion species as examples, the series of change in cholesteric pitch P appears to be as follows.

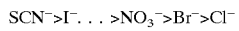

The ion species of the electrolyte can be selected according to the desired display color in the absence of an electric field. For example, the non-field display color can be set to blue by selecting a hydroxypropylcellulose with an average substitution degree of 1.8 and water, as the liquid-crystal polymer and the aqueous solvent, respectively, and setting the concentration of the electrolyte LiCl at 0.5 mol/liter, or to red by using the same polymer and solvent as above and setting the concentration of the electrolyte LiSCN at 0.5 mol/liter.

When the solubility of the electrolyte in aqueous medium is taken into consideration, it is undesirable to set the concentration of the electrolyte too high. It is also recommendable to avoid setting the electrolyte concentration too low, in order to provide an ion gradient of the order insuring an appreciable change in display color upon application of an electric field. Therefore, the concentration of the electrolyte can be selected according to the solubility and degree of change in display color, thus being for example about 0.01 to 10 mol/liter, preferably 0.03 to 5 mols/liter, and more preferably about 0.05 to 2.0 mols/liter.

The aqueous solvent may be water alone or a mixture of water with a water-miscible organic solvent. The water-miscible organic solvent includes water-soluble organic solvents such as alcohols (e.g. methanol, ethanol, isopropyl alcohol, etc.), ethers (e.g. dioxane, tetrahydrofuran, etc.), ketones (e.g. acetone etc.), organic acids (e.g. acetic acid, trichloroacetic acid, trifluoroacetic acid etc.), nitrogen-containing water-soluble solvents (e.g. trimethylamine, triethylamine, ethanolamine, triethanolamine, pyridine, etc.), nitriles (acetonitrile etc.), amides (e.g. formamide, N,N-dimethylformamide, etc.), cellosolves (e.g. methylcellosolve, ethylcellosolve, etc.), and polyhydric alcohols (e.g. ethylene glycol, polyethylene glycol, glycerol, etc.). The water-miscible organic solvent is preferably a polar solvent (an organic solvent with a high dielectric constant or permittivity). Such water-miscible organic solvents can be used as a mixture of two or more species.

In the liquid crystal display elemental device of the invention, the liquid-crystal polymer and the electrolyte coexist in an aqueous medium so that the ions advantageously migrate fast upon application of an electric field. Therefore, the water content of the aqueous medium is preferably high, and may for example be about 20 to 100 weight %, preferably about 50 to 100 weight %, and more preferably about 80 to 100 weight %.

The liquid crystal composition comprising the liquid-crystal polymer, electrolyte, and aqueous medium may be supplemented, where necessary, with a variety of additives such as a coloring agent, stabilizer, surfactant, antiseptic, antifreeze, and so forth.

For the purpose of providing an external stimulus, the liquid crystal composition is hermetically interposed between a pair of electrodes to form a liquid crystal display elemental device. This liquid crystal display elemental device should be transparent at least in its display area according to the layout of the electrodes and display area. In the display device of the invention, preferably a liquid crystal composition, which is transparent irrespective of application of an electric field, is employed but, depending on the kind of electrolyte, an opacity may form in the vicinity of one of the electrodes in some cases. In such cases, the area near that electrode may be masked and the remaining transparent area be utilized as the display area.

The liquid crystal display elemental device of the invention can be constructed by using (i) a pair of electrodes at least one of which is a transparent electrode, a spacer means interposed between the electrodes, and a liquid crystal composition sealed between the electrodes or (ii) a pair of substrates at least one of which is a transparent substrate, a pair of electrodes functioning as spacers between said substrates, and a liquid crystal composition sealed between the substrates. In the construction (i), the transparent electrode can be used as the display area or panel and, in the construction (ii), the transparent substrate can be used as the display area or panel. Furthermore, the liquid crystal display elemental device may be a single liquid crystal display cell or a matrix comprising a plurality of liquid crystal display cells. In addition, the actuation (application of a voltage) of the liquid crystal display cells constituting the matrix may be effected via the respective control circuits.

The electrode gap can be judiciously selected according to the configuration or architecture of the display device, for example from the range of 50 μm to 200 mm (e.g. about 50 μm to 10 mm in the construction (i) or about 5 to 200 mm in the construction (ii)).

The application voltage can be selected according to the electrode gap and other parameters, for example from the range of about 0.01 to 100 V, preferably about 0.01 to 50 V, and particularly about 0.05 to 10 V. The voltage may be a direct-current voltage.

The electric field formed between the pair of electrodes can be selected from the range of about 0.01 to 10 V/mm (preferably 0.1 to 1 V/mm), for instance.

The polarity of the electrodes may be switchable. Moreover, a gate electrode may be provided to block migration of the ions and thereby control the display color.

The present invention may be utilized not only as a liquid crystal display or an optical medium but also as an electrochromic material applicable to interior, fashion, labeling, shutter, and toy uses, thus broadening the scope of use of liquid crystal display.

In accordance with the present invention, the control of the display color of a cholesteric liquid crystal by an electric field, which has hitherto been considered difficult, can be realized. Particularly, despite its being a display device using a liquid-crystal polymer, the display can be controlled by an electric field.

EXAMPLES

The following examples illustrate the present invention in further detail and should by no means be construed as defining the scope of the invention.

Example 1

[Manufacture of a liquid crystal display device]

In a 0.5 mol/liter aqueous solution of lithium iodide (LiI) was dissolved a hydroxypropylcellulose (HPC) with an average substitution degree of 1.8 at a final HPC concentration of 62.5 weight %. This solution was then allowed to stand in the refrigerator for at least 1 month.

In the aqueous HPC/LiI solution thus obtained, the cholesteric sense was clockwise. This aqueous HPC/LiI solution showed cholesteric liquid crystallinity and assumed a uniform orange color at a temperature of 20° C. The cholesteric sense was clockwise. Then, using a Teflon spacer equipped with 50 μm-thick platinum electrodes, the above aqueous HPC/LiI solution was sealed between transparent glass sheets, with the electrode gap being set to 15 mm (substrate-to-substrate spacing: 500 μm), to fabricate a liquid crystal display device.

[Evaluation of the liquid crystal display device]

A direct-current voltage of 4.5 V was applied between the platinum electrodes at 20° C. Upon voltage application, a change in color of the composition to the short-wavelength side occurred toward the negative electrode and both the hue and tone changed with time. Thus, at 45 minutes after application of the voltage, the display color regions of orange, yellow, and green appeared from the positive electrode side toward the negative electrode side. After 105 minutes, the color regions of red, orange, yellow, green, blue, and violet appeared. After 195 minutes, the color regions of red, orange, yellow, green, blue, and violet and a colorless region appeared. These findings indicate that an ion gradient was formed by the external electric field and that the cholesteric pitch P changed according to this ion gradient.

Example 2

A liquid crystal display device was produced by the same procedure as in Example 1 except that potassium iodide (KI) was used as the low-molecular-weight electrolyte. As a result, a display device showing a uniform green color at 20° C. was obtained. Referring to the length-wise (longitudinal) direction of this liquid crystal display device, a display area (window) was formed by masking the area corresponding to one-third of the length at the negative electrode side and the edge of the positive electrode side.

When a direct-current voltage of 4.5 V was applied between the platinum electrodes at 20° C., the display color changed from green to yellow. At 45 minutes after application of the voltage, the color regions of yellow and green appeared from the positive electrode side toward the negative electrode side. After 135 minutes, a uniform yellow color developed all over.

What is claimed is:

1. A color liquid crystal display element comprising a pair of electrodes, and a liquid crystal composition being hermetically interposed between said electrodes, wherein said liquid crystal composition comprises a cholesteric liquid-crystal polymer, an electrolyte, and an aqueous medium.

2. The color liquid crystal display element of claim 1 wherein said liquid crystal composition comprises a transparent solution comprising a cholesteric liquid-crystal polymer, an electrolyte, and an aqueous solvent.

3. The color liquid crystal display element of claim 1, the display color of which is controllable by an applied electric field.

4. The color liquid crystal display element of claim 2 wherein the liquid-crystal polymer is a cellulose derivative.

5. The color liquid crystal display element of claim 4 wherein the liquid-crystal polymer is at least one member selected from the group consisting of hydroxyalkylcelluloses, alkylcelluloses, hydroxyalkylalkylcelluloses, and cyanoalkylcelluloses.

6. The color liquid crystal display element of claim 4 wherein the liquid-crystal polymer is a hydroxyalkylcellulose.

7. The color liquid crystal display element of claim 1 wherein the cationic component of the electrolyte is an inorganic cation selected from the group consisting of alkali metal cations and alkaline earth metal cations, and the anionic component of the electrolyte is an inorganic anion selected from the group consisting of thiocyanate anions, halide anions, and inorganic acid anions.

8. The color liquid crystal display element of claim 1 wherein the electrolyte is at least one member selected from the group consisting of lithium salts, sodium salts, potassium salt, cesium salts, and calcium salts.

9. The color liquid crystal display element of claim 1 wherein the water content of the aqueous medium is 50 to 100 weight %.

10. The color liquid crystal display element of claim 1 wherein the liquid crystal composition comprises 30 to 70% by weight of a liquid-crystal polymer, 0.01 to 10 mols/liter of an electrolyte, and an aqueous medium having a water content of 80 to 100 weight %.

11. A liquid crystal composition for a color liquid crystal display element, which comprises a cholesteric liquid-crystal polymer, an electrolyte, and an aqueous medium, wherein a display color of the cholesteric liquid-crystal is controllable by an applied electric field.

* * * * *

UNITED STATES PATENT AND TRADEMARK OFFICE
CERTIFICATE OF CORRECTION

PATENT NO. : 6,096,392
DATED : August 1, 2000
INVENTOR(S): Y. NISHIO

It is certified that error appears in the above-identified patent and that said Letters Patent are hereby corrected as shown below:

In category "[73] Assignee:", please change the Assignee's address from "Tokyo, Japan" to -- Osaka, Japan --.

Signed and Sealed this

Seventeenth Day of April, 2001

Attest:

NICHOLAS P. GODICI

Attesting Officer

Acting Director of the United States Patent and Trademark Office